United States Patent [19]

Taki

[11] Patent Number: 4,943,131
[45] Date of Patent: Jul. 24, 1990

[54] THIN-FILM OPTICAL FUNCTION ELEMENT, AND OPTICAL HEAD USING THE SAME

[75] Inventor: Kazunari Taki, Nagoya, Japan

[73] Assignee: Brother Kogyo Kabushiki Kaisha, Aichi, Japan

[21] Appl. No.: 261,232

[22] Filed: Oct. 24, 1988

[30] Foreign Application Priority Data

Oct. 30, 1987 [JP] Japan .................................. 62-277009

[51] Int. Cl.$^5$ .............................................. G02B 6/12
[52] U.S. Cl. ............................ 350/96.12; 350/96.13; 350/96.15
[58] Field of Search ............... 350/96.12, 96.13, 96.15, 350/96.11, 96.14

[56] References Cited

U.S. PATENT DOCUMENTS

| | | | |
|---|---|---|---|
| 3,957,341 | 5/1976 | Taylor | 350/96.15 |
| 4,400,052 | 8/1983 | Alferness et al. | 350/96.12 |
| 4,583,817 | 4/1986 | Papuchon | 350/96.14 |
| 4,669,815 | 6/1987 | Thaniyavarn | 350/96.15 |
| 4,679,892 | 7/1987 | Haisma et al. | 350/96.12 |

*Primary Examiner*—John D. Lee
*Attorney, Agent, or Firm*—Oliff & Berridge

[57] ABSTRACT

A thin-film optical function element, including a substrate formed of a dielectric material, a first optical waveguide consisting of a thin film of a dielectric material formed on the substrate, and a second optical waveguide consisting of another thin film of another dielectric material formed on the substrate. The first optical waveguide has a substantially same propagation constant with respect to two different modes which have field patterns whose vibrating directions are perpendicular to each other. The second optical waveguide is optically coupled to the first optical waveguide, and is adapted to pass therethrough only one of the two different modes.

6 Claims, 4 Drawing Sheets

THIN-FILM OPTICAL FUNCTION ELEMENT, AND OPTICAL HEAD USING THE SAME

BACKGROUND OF THE INVENTION

1. Field of the Invention

The present invention relates generally to a thin-film optical function element, and more particularly to such a thin-film optical function element adapted to separate two different optical modes which have field patterns whose vibrating directions are perpendicular to each other. This optical function element is suitably used for an optical head for a magneto-optical data storage disk, wherein a light beam produced by a light source is guided through a thin-film optical waveguide toward the magnetooptical disk, such that the light beam maintains a constant plane of polarization, and wherein one or both of the two transverse modes of the light beam reflected by the disk is/are converted into an electric signal or signals.

2. Discussion of the Prior Art

Figure 9:
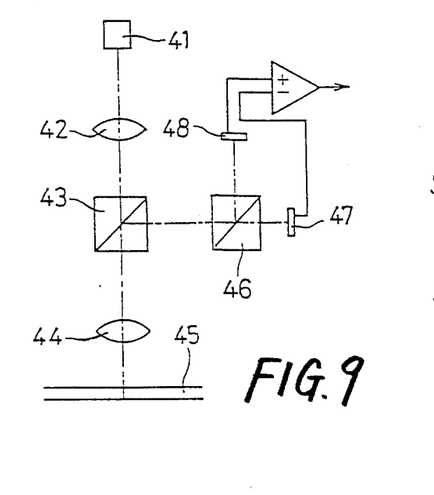
FIG. 9 is a schematic view depicting an arrangement of a known optical head for a magnetooptical disk.
Figure 10:
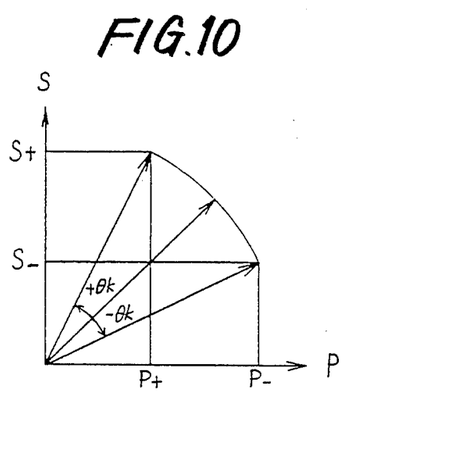
FIG. 10 is a view explaining the principle of a data reading operation by the known optical head of FIG. 9.

There is shown in FIG. 9 a conventional optical-head for writing and reading information on and from a magneto-optical memory or storage disk. This optical head is adapted such that a laser beam emitted from a semiconductor laser element 41 is collimated by a collimator lens 42, transmitted through a half mirror 43, and focused by an objective or converging lens 44 on the surface of a magneto-optical disk 45. The laser beam reflected by the surface of the disk 45 is reflected by the half mirror 43 toward a polarizing beam splitter 46. A component P of the laser beam incident upon the beam splitter 46 is transmitted through the beam splitter 46, while a component S of the beam is reflected by the beam splitter 46. These two components P and S are received by respective two light-sensitive elements 47, 48. Information stored at a specific reading spot on the magnetooptical disk 45 which is irradiated with the laser beam is read by obtaining a difference between output levels of the two light-sensitive elements 47, 48. The principle of this information reading or retrieving operation is illustrated in FIG. 10. If the laser beam was reflected by the surface of the disk 45 without being influenced by the information stored thereon, the plane of polarization of the reflected laser beam incident upon the polarizing beam splitter 46 would be inclined at 45° with respect to the axes of the beam splitter 46 along which components P and S are polarized. The plane of polarization of the reflected laser beam from the disk 45 is rotated by an angle of $+\theta k$ or $-\theta k$ with respect to the plane of polarization of the incident laser beam, depending upon the direction in which the irradiated reading spot is magnetized, i.e., depending upon the stored data "0" or "1". When the plane of polarization of the reflected laser beam is rotated by $+\theta k$, a difference between the outputs of the two light-sensitive elements 47, 48 which receive the P and S components of the reflected laser beam is equal to $(S_+ - P_+)$. When the plane of polarization is rotated by $-\theta k$, the above difference is equal to $(S_- - P_-) = -(S_+ - P_+)$. Thus, the differential outputs $\pm(S_+ - P_+)$ corresponding $\pm\theta k$ are obtained by a differential amplifier which receive the outputs of the light-sensitive elements 47, 48. When information is written on the disk 45, the intensity of the produced laser beam is increased to heat the relevant spot on the disk 45 to a temperature in the neighborhood of the Curie point or above the compensation temperature of the material of the disk. The heated spot is then magnetized in the appropriate direction corresponding to the information to be written, within an externally produced magnetic field. When the information on the disk is erased, the relevant spots on the disk are unidirectionally magnetized in the predetermined direction.

The conventionally available optical head as described above uses optical components made of glasses or other suitable materials, such as lenses, half mirror and prism. These optical components require fine adjustments of their optical axes. Further, the optical head using these optical components tends to be large-sized and heavy, and consequently the overall arrangement of the information reading and writing system tends to be large-sized. Moreover, the relatively heavy optical head leads to a comparatively long access time.

SUMMARY OF THE INVENTION

It is therefore a first object of the present invention to provide a thin-film optical function element which is suitably used to provide a comparatively small-sized and lightweight, inexpensive optical head for a magnetooptical data storage disk, which assures a reduced access time.

A second object of the present invention is to provide an optical head for a magnetooptical data storage disk, which uses such a thin-film optical function element.

The first object may be attained according to one aspect of the present invention, which provides a thin-film optical function element, comprising a substrate formed of a dielectric material, a first optical waveguide consisting of a thin film of a dielectric material formed on the substrate, and a second optical waveguide consisting of another thin film of another dielectric material formed on the substrate. The first optical waveguide has a substantially same propagation constant with respect to two different modes which have field patterns whose vibrating directions are perpendicular to each other. The second optical waveguide is optically coupled to the first optical waveguide, and guiding therethrough only one of the two different modes.

In the optical function element of the present invention constructed as described above, the above-indicated one mode is emitted from the end of the second waveguide, while the other mode is emitted from an end face of the substrate or from the end of another waveguide. By detecting the intensity or intensities of the one or both of the two different modes thus emitted from the optical function elements, information corresponding to the intensity or intensities of these modes may be obtained. For improved accuracy of the information, it is recommended to obtain a difference between the intensities of the two modes.

Although the thin-film optical function element according to the principle of the present invention is suitably used for an optical head for a magneto-optical data storage disk, it is to be understood that the instant optical function element may be applied to various other fields of technology which involve a change in the polarization plane of a light beam.

In one form of the optical function element of the invention, the substrate consists of an anisotropic crystal, and the first optical waveguide permits a TE mode and a TM mode to be propagated therethrough at a same velocity such that a linearly polarized light beam maintains a predetermined constant plane of polarization. In this case, the second optical waveguide has a refractive index which is intermediate between a first refractive index of the substrate with respect to ordinary rays of light, and a second refractive index of the substrate with respect to extraordinary rays of light. In this form of the optical element, one of the TE and TM modes is emitted as an output from the end of the second waveguide, while the other mode is emitted as another output from the end face of the substrate.

The first and second optical waveguides may be coupled to each other by mutual contact, or alternatively by a directional coupler. In the latter case, the optical function element may be adapted such that the second optical waveguide has two different propagation constants with respect to the two different modes, respectively, while one of the different propagation constants is equal to a propagation constant of the first optical waveguide. In this case wherein the directional coupler is used, one of the two modes is obtained from the end of the first waveguide, while the other mode is obtained from the end of the second waveguide.

In another form of the optical function element of the invention, the first optical waveguide consists of an anisotropic crystal and is partially covered by a clad layer having a refractive index which is intermediate between a first refractive index of the first optical waveguide with respect to ordinary rays of light, and a second refractive index of the first optical waveguide with respect to extraordinary rays of light. The clad layer functions as the second optical waveguide. In this case, one of the two modes is obtained from the end of the clad layer, while the other mode is obtained from the end of the first waveguide.

The second object may be achieved according to another aspect of the present invention, which provides an optical head for a magneto-optical disk, incorporating the thin-film optical function element constructed according to the first aspect of the invention described above, wherein the first optical waveguide consists of a Y-branching waveguide having a common path and two branch paths which merge with each other into the common path, and the second optical waveguide is coupled to one of the two branch paths of the Y-branching waveguide. The optical head comprises (a) a light emitting-element coupled to the other branch path of the Y-branching waveguide and operable to emit a linearly polarized light beam, (b) a converging lens coupled to the common path of the Y-branching waveguide, for converging the linearly polarized light beam which is guided through the first optical waveguide, and (c) at least one light-sensitive element each coupled to a corresponding one of the second optical waveguide and a portion of the substrate adjacent to the second optical waveguide.

In the thin-film optical function element of the present invention constructed as described above, a light beam produced by a suitable light-emitting element attached to the instant optical function element is guided through the first optical waveguide, and is emitted from the first optical waveguide so as to irradiate an appropriate spot on a magnetooptical disk. The light beam incident upon the disk is reflected by the disk surface, and the reflected light beam is first guided through the first optical waveguide and then admitted into the second optical waveguide. Only one of the two different modes of the reflected light beam is guided and transmitted through the second optical waveguide, and is emitted from the end of the second optical waveguide. Information stored at the irradiated spot on the magnetooptical disk can be read based on an output of a light-sensitive element which receives the mode emitted from the second optical waveguide or the other mode emitted from the substrate, or based on a difference between the outputs of the two light-sensitive elements which receive the separated two modes.

Since the instant thin-film optical function element is alone capable of separating the light beam reflected by the magneto-optical data storage disk into the two different modes to be received by the respective light-sensitive elements, the optical head which uses this optical function element does not require other optical components such as lenses and a half mirror as indicated at 42, 43, 44 in FIG. 9, and can be accordingly reduced in size and weight. The elimination of the optical components contributes to shortening the access time of the optical head, and eliminates otherwise required adjustments of the optical axes of these components, thereby assuring increased operating reliability of the optical head.

In one form of the optical head of the invention, the light-emitting element emits the linearly polarized light beam such that the light beam has a plane of polarization which is inclined at 45° with respect to a plane of the first optical waveguide, and the two light-sensitive elements which are coupled to the second optical waveguide and the portion of the substrate, respectively. In this case, the information stored at the relevant spot on the magnetooptical disk can be suitably read based on a difference between the outputs of the two light-sensitive elements.

In another form of the optical head of the invention, the light-emitting element emits the linearly polarized light beam such that the light beam has a plane of polarization which is inclined at an angle between 45° and 90° with respect to a plane of the first optical waveguide. In this case, only one light-sensitive element is coupled to the second optical waveguide, and the information at the relevant spot on the disk can be read based on the output of this light-sensitive element.

Although the light-emitting element and the converging lens may be indirectly coupled to the first optical waveguide via optical fibers or other optical coupling elements, it is preferable that the light-emitting element and the converging lens are directly coupled to the first optical waveguide. Similarly, a light-sensitive element may be directly coupled to the second optical waveguide, for example. In this case wherein the light-emitting and/or light-sensitive elements, and/or the converging lens are directly coupled to the waveguides, the optical head may be made relatively compact and lightweight.

The second object may also be achieved according to a further aspect of the present invention, which provides an optical head for a magnetooptical disk, incorporating the thin-film optical function element constructed according to the first aspect of the present invention, wherein the first optical waveguide consists of a first portion and a second portion which are coupled to each other by a directional coupler. The optical head comprises (a) a light-emitting element coupled to the first portion of the first optical waveguide and operable to emit a linearly polarized light beam, (b) a converging lens coupled to an end of the second portion of the first optical waveguide, for converging the linearly polarized light beam which is guided through the first and second portions, the other end of the second portion being coupled to the second optical waveguide, and (c) at least one light-sensitive element each coupled to a corresponding one of an end portion of the second optical waveguide remote from the second portion of the first optical waveguide, and a portion of the substrate adjacent to the end portion of the second optical waveguide.

The second object may also be achieved according to a still further aspect of the present invention, which provides an optical head for a magnetooptical disk, comprising: a substrate consisting of an anisotropic crystal; a first optical waveguide formed on the substrate and having a substantially same propagation constant with respect to two different modes which have field patterns whose vibrating directions are perpendicular to each other; a light-emitting element coupled to one end of the first optical waveguide and operable to emit a linearly polarized light beam; a lens for collimating the linearly polarized light beam into parallel rays of light; a converging lens coupled to the other end of the first optical waveguide, for converging the parallel rays of light which have been guided through the first optical waveguide, so that the converged rays of light are focused on a surface of the magnetooptical disk, whereby the converged rays of light are reflected by the surface of the disk and are admitted into the first optical waveguide through the converging lens; a grating disposed in the first optical waveguide, for reflecting the rays of light admitted into the first optical waveguide, in a direction different from that in which the parallel rays of light are guided through the first optical waveguide toward the converging lens; a second optical waveguide formed on the substrate and coupled to a portion of the first optical waveguide which guides the light reflected by the grating, the second optical waveguide having a refractive index which is inermediate between a first refractive index of the substrate with respect to ordinary rays of light, and a second refractive index of the substrate with respect to extraordinary rays of light; a first light-sensitive element coupled to an end of the second optical waveguide which is remote from the first optical waveguide; and a second light-sensitive element coupled to a portion of the substrate adjacent to the second optical waveguide. In this case, the information at the relevant spot on the magnetooptical disk can be read based on a difference between the outputs of the first and second light-sensitive elements.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
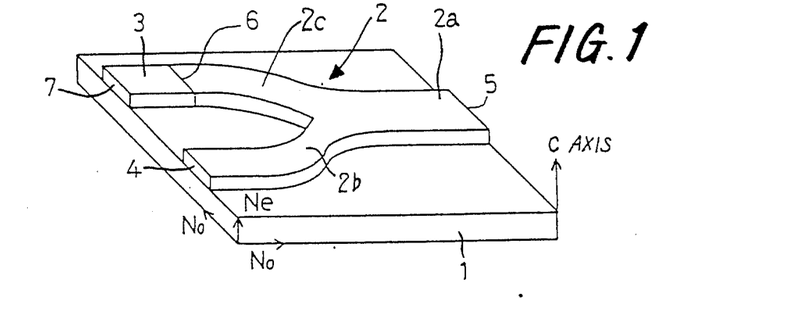
FIG. 1 is a perspective view showing one embodiment of a thin-film optical function element of the present invention.

Referring first to FIG. 1, there is shown a planar rectangular dielectric substrate 1 formed of an anisotropic crystal, a crystal of $LiTaO_3$ in this specific example. On one of opposite major surfaces of this substrate 1, there is formed a first optical waveguide in the form of a dielectric thin-film Y-branching waveguide 2 which generally extends from one of the opposite sides of the substrate 1 to the other. The Y-branching waveguide 2 has a common path 2a, and a pair of branch paths 2b, 2c which merge with each other into the common path 2a. The branch path 2c has a shorter length than the other branch path 2b. This first optical waveguide 2 has a refractive index $N_{f1}$. On the same major surface of the substrate 1, there is also formed a second optical waveguide in the form of a dielectric thin-film waveguide 3 which is coupled at its one end to the end of the branch path 2c of the first or Y-branching waveguide 2 which is remote from the common path 2a. This second optical waveguide 3 has a refractive index $N_{f2}$.

The $LiTaO_3$ substrate 1 has a refractive index $N_o$ of 2.175 with respect to ordinary rays of light, and a refractive index $N_e$ of 2.180 with respect to extraordinary rays of light. The $LiTaO_3$ crystal is cut such that the plane of the major surfaces of the substrate 1 is perpendicular to the C axis of the crystal. Namely, the refractive index $N_e$ is taken in the direction perpendicular to the plane of the substrate 1, while the refractive index $N_o$ is taken in the direction which is parallel to the plane of the substrate 1.

The refractive index $N_{f1}$ of the first, Y-branching waveguide 2 is determined such that the index $N_{f1}$ is larger than the refractive index $N_e$ of the substrate 1, which is larger than the refractive index $N_o$. That is, the refractive index $N_{f1}$ is determined so as to satisfy an inequality $N_{f1} > N_e > N_o$.

Figure 2:
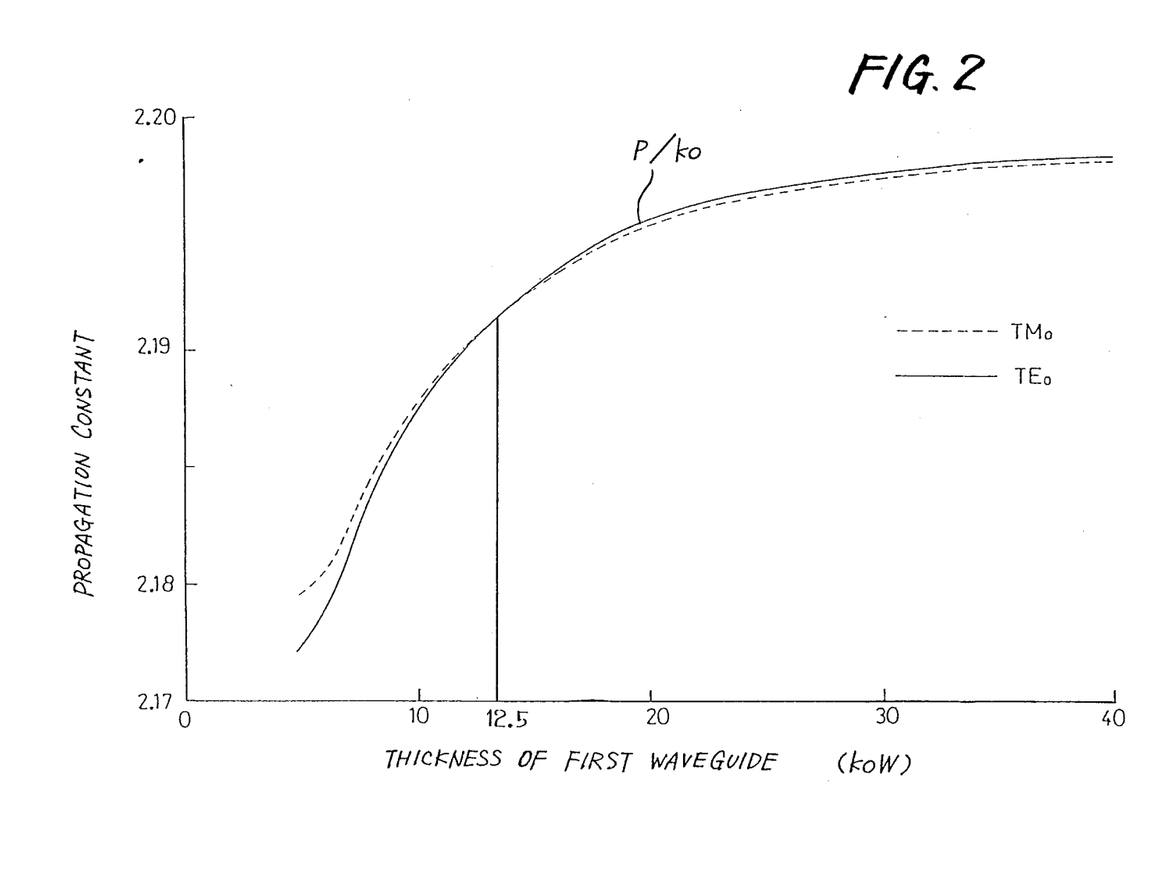
FIG. 2 is a graph showing a relationship between the thickness and the propagation constant of a waveguide of the optical function element.

For example, it is assumed that a light beam to be guided or propagated through the waveguide 2 includes a $TE_0$ mode and a $TM_0$ mode which have field patterns in a plane transverse to the direction of propagation of the light beam through the waveguide 2. The directions of vibration of the field patterns of the $TE_0$ and $TM_0$ modes are perpendicular to each other. Assuming, for example, that the refractive index $N_{f1}$ of the first optical waveguide 2 is 2.20, there exists a relationship as shown in FIG. 2, between a thickness $k_0W$ of the first waveguide 2 as normalized by $P/k_0$, and a propagation constant $P/k_0$ of the first waveguide 2, where $k_0 = 2\pi/\lambda$, where $\lambda$ is the wavelength of the light beam. As indicated in FIG. 2, when the normalized thickness $k_0W$ is 12.5 (W = 1.26 microns, for = 0.6328 microns), the propagation constant with respect to the $TE_0$ mode is equal to that with respect to the $TM_0$ mode, whereby the phases of the two modes match each other. Accordingly, when a linearly polarized light beam having a given plane of polarization is incident upon an end face 4 of the branch path 2b of the Y-branching waveguide 2, the $TE_0$ mode whose plane of polarization is parallel to the plane of the substrate 1, and the $TM_0$ mode whose polarization plane is perpendicular to the plane of the substrate 1 are propagated at the same phase velocity, through the waveguide 2, and are emitted from an end face 5 of the common path 2a. There arises no phase difference between the $TE_0$ and $TM_0$ components of the linearly polarized light beam at the end face 5. Thus, the linearly polarized light beam incident upon the end face 4 is identical with the linearly polarized light beam emitted from the end face 5.

It is also noted that when the linearly polarized light beam emitted from the end face 5 is reflected by a magnetooptical data storage disk, for example, the reflected light beam is incident upon the end face 5 and is propagated through the common path 2a and the branch path 2c, toward an interface 6 between the first and second optical waveguides 2, 3, such that the linearly polarized light beam maintains the predetermined planes of polarization while travelling the first waveguide 2.

The refractive index $N_{f2}$ of the second optical waveguide 3 is determined such that the refractive index $N_{f2}$ is intermediate between the refractive indices $N_e$ and $N_o$ of the substrate 1, i.e., so as to satisfy an inequality $N_e > N_{f2} > N_o$. Thus, the refractive index $N_{f2}$ of the second waveguide 3 is larger than the refractive index $N_o$ with respect to the $TE_0$ mode, whereby the $TE_0$ mode is properly propagated or guided through the waveguide 3. On the other hand, the refractive index $N_{f2}$ is smaller than the refractive index $N_e$ with respect to the $TM_0$ mode, whereby the $TM_0$ mode leaks from the waveguide 3 toward a portion of the substrate 1 underlying the waveguide 3. As a result, the $TE_0$ mode of the linearly polarized light beam reaching the interface 6, that is, the component of the beam whose field pattern is parallel to the plane of the substrate 1 reaches an end face 7 of the second waveguide 3. However, the $TM_0$ mode of the light beam whose field pattern is perpendicular to the plane of the substrate 1 is propagated into the portion of the substrate 1 underlying the second waveguide 3.

Figure 3:
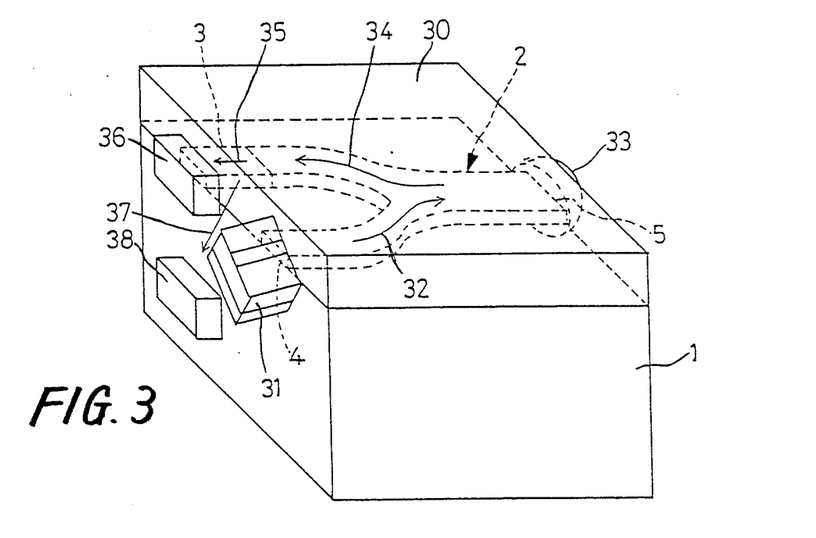
FIG. 3 is a perspective view of an optical head for a magnetooptical disk, which uses the thin-film optical function element of FIG. 1.

Referring to FIG. 3, there is shown an example of an optical head for a magnetooptical data storage disk, which employs the thin-film optical function element of FIG. 1. The waveguide assembly 2, 3 is covered by a clad layer 30. Further, a semi-conductor laser element 31 is attached to the end face 4 of the first, Y-branching waveguide 2. The laser element 31 is adapted to produce a laser beam whose plane of polarization is inclined at 45° with respect to the plane of the waveguide 2 or the plane of the major surfaces of the substrate 1. Consequently, the $TE_0$ and $TM_0$ modes having the same intensity are propagated through the branch path 2b and common path 2a of the first waveguide 2, and are emitted from the end face 5. Since the propagation constants of the first waveguide 2 with respect to the $TE_0$ and $TM_0$ modes are equal to each other, the plane of polarization of the linearly polarized light beam emitted from the end face 5 is inclined at 45°, like the light beam incident upon the end face 4.

A converging lens 33 is attached to the end face 5 of the first waveguide 2, so that the linearly polarized light beam reaching the end face 5 is converged by the lens 33 so that the converged light beam is focused on an appropriate spot on the surface of the magnetooptical storage disk (not shown). The light beam incident upon the magnetooptical disk is reflected by the same and is incident upon the converging lens 33 and the end face 5. The plane of polarization of the light beam reflected by the disk with respect to that incident upon the disk is rotated in the positive or negative direction depending upon the direction of magnetization of the irradiated spot on the disk. The reflected light beam is then transmitted through the common path 2a, and is split into two parts at the merging point of the two branch paths 2b, 2c of the Y-branching arrangement of the waveguide 2. The part of the light beam which is guided into the branch path 2c reaches the interface 6 between the first and second waveguides 2, 3. As described above, the $TE_0$ component of the light beam reaching the interface 6 is further propagated through the second waveguide 3 (as indicated at 35 in FIG. 3) and is received by a suitable light-sensitive element 36 such as a PIN photodiode attached to the end face 7 of the second waveguide 3. On the other hand, the $TM_0$ mode of the light beam reaching the interface 6 is not be guided through the second waveguide 3, that is, leaks off the waveguide 3 and travels through the portion of the substrate 1 underlying the waveguide 3, as indicated at 37 in FIG. 3, such that the $TM_0$ mode is emitted from a portion of the end face of the substrate 1 which is spaced apart from the light-sensitive element 36. The thus emitted $TM_0$ mode 37 is received by a second light-sensitive element 38 disposed below the first light-sensitive element 36, as shown in FIG. 3.

The $TE_0$ and $TM_0$ components 35, 37 received by the light-sensitive elements 36, 38 correspond to S and P components taken along the vertical and horizontal axes of a graph in FIG. 10. It will be understood from this graph that information stored at the relevant spot irradiated by the light beam can be read based on a difference between the outputs of the two light-sensitive elements 36, 38 which receive the $TE_0$ and $TM_0$ components 35, 37, as practiced in a known optical reading apparatus for a magnetooptical disk as illustrated in FIG. 9. Information writing and erasing operations on the magnetooptical disk can be effected in the same manner as practiced in the known arrangement. Namely, the relevant spots on the disk are heated with an increased intensity of the light beam produced by the laser element 31, and are subjected to an externally produced mangetic field in an appropriate direction.

The waveguides 2 and 3 are prepared by first forming on the substrate 1 thin films of suitable dielectric materials, by a suitable method usually practiced for ordinary optical waveguides, such as sputtering or vacuum vapor deposition, and then shaping the formed thin films into desired configurations by photolithography teachnique. The dielectric materials used for the waveguides 2, 3 may be selected from transparent dielectric materials such as $SiO_2$, $ZnO$, $ZnS$, $TiO_2$ and $SiO_x$, or a mixture thereof. In the case where the mixture of $SiO_2$ and $TiO_2$ is employed for the waveguide films, the refractive indices of the obtained waveguides 2, 3 may be adjusted as needed, by changing the proportions of $SiO_2$ and $TiO_2$. The clad layer 30 may be prepared in a similar manner, by sputtering or vacuum vapor deposition. However, the clad layer 30 is not essential and may be eliminated. The converging lens 33 is formed to a part-spherical shape, by using a photoresist, or by utilizing a surface tension of a molten glass or similar material.

It will be understood that the present invention is not limited to the details of the above-illustrated embodiments, but may be embodied with various changes and modifications within the spirit of the present invention.

Figure 4:
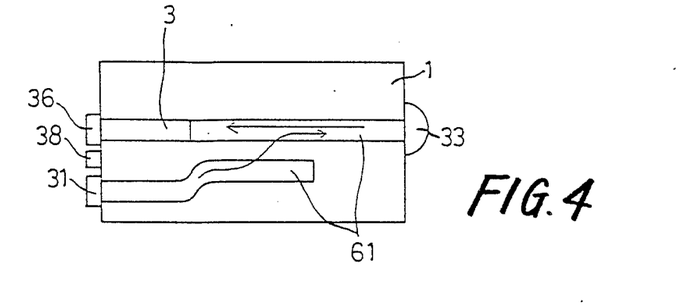
FIG. 4 is a plan view of another embodiment of the optical head of the invention.
Figure 5:
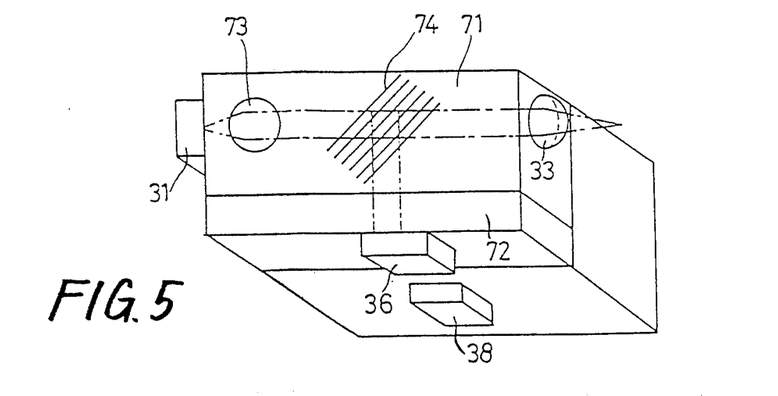
FIG. 5 is a perspective view of a further embodiment of the optical head of the invention.

For example, the first, Y-branching waveguide 2 may be replaced by a directional coupler as indicated at 61 in FIG. 4. Further, the waveguides may be ridge waveguides. A further modification is shown in FIG. 5, wherein a thin-film optical function element of an optical head uses a two-dimensional waveguide assembly, which consists of a first waveguide 71 and a second waveguide 72. The first waveguide 71 has a same propagation constant with respect to the TE and TM modes. The second waveguide 72 is adapted such that the TE mode or component is guided through the waveguide 72, while the TM mode or component deviates off the waveguide 72 and travels through the portion of the substrate underlying the waveguide 72. The laser beam produced by the laser element 31 is collimated into parallel rays of light by a geodesic lens 73, for example, and is propagated through the first waveguide 71 to the converging lens 33, from which the light beam is emitted toward a magnetooptical disk. The light beam reflected by the disk surface is incident upon the lens 33 and is guided through the first waveguide 71. At a portion of the first waveguide 71 between the lenses 73, 33, there is formed a grating 74 which reflects the light beam from the converging lens 33, in a direction perpendicular to the direction of propagation of the light beam between the lenses 73, 33. Consequently, the light beam reflected by the grating 74 is incident upon the second waveguide 72, which separates the received light beam into the TE and TM components. The light beam may have the same plane of polarization with respect to the plane of the substrate 1, as in the embodiment of FIG. 3.

While the semi-conductor laser element 31, converging lens 33 and light-sensitive element 36 are directly coupled to the end faces of the waveguides 2, 3, 71, 72, these elements may be coupled to the waveguides via a suitable intermediate element such as an optical fiber, optical isolator or rod lens.

Figure 6:
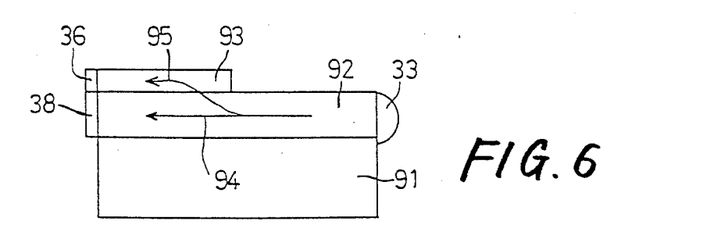
FIG. 6 is a cross sectional view of a still further embodiment of the invention.

The substrate 1 may be formed of a LiNbO₃ crystal, rather than the LiTaO₃ crystal. Further, the crystallographic axis orientation may be suitably modified. Although the anisotropic crystal is used for the substrate 1 of the embodiments illustrated above, a modification as indicated in FIG. 6 is possible, for example. In this modified arrangement of FIG. 6, a thin film 92 of LiNbO₃ is formed on a LiTaO₃ substrate 91. LiNbO₃ has a refractive index $N_e$ of 2.20 with respect to the ordinary rays of light, and a refractive index $N_o$ of 2.29 with respect to the extraordinary rays of light. Therefore, the thin film 92 should be oriented such that the C axis is parallel to the plane of the thin film 92 and perpendicular to the direction of propagation of the light beam through the thin film 92, so as to obtain a phase matching between the TE and TM modes 94, 95. To separate these two different modes from each other, a portion of the thin film 92 adjacent to the light-sensitive element 38 is covered by a clad layer 93 which has a refractive index $N_c$ which is determined so as to satisfy an inequality $N_e < N_c < N_o$. That is, the refractive index $N_c$ of the clad layer 93 is smaller than the refractive index $N_o$ with respect to the TM mode 94, but is larger than the refractive index $N_e$ with respect to the TE mode 95. Accordingly, only the TM mode 94 is continuously propagated through the thin film 92, but the TE mode 95 deviates into the clad layer 93.

Figure 7:
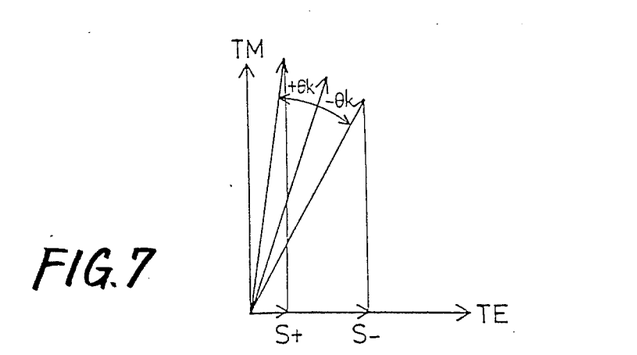
FIG. 7 is a view explaining the principle of a data reading operation by the optical head according to one form of the invention.

In the embodiments illustrated above, the plane of polarization of the linearly polarized laser beam from the semi-conductor laser element 31 is inclined at 45° with respect to the plane of the first optical waveguide 2, 61, 71, 92. However, it is possible that the plane of polarization of the laser beam is inclined at an angle between 90° (0°) and 45°, for example, an angle considerably close to 90° or 0°, with respect to the plane of the waveguide. In this case, only one of the TE and TM modes is detected by a light-sensitive element, and information reading is effected based on the output of this light-sensitive element. A graph of FIG. 7 illustrates an angle of rotation of the polarization plane of the light beam reflected by a magnetooptical disk with respect to the polarization plane of the incident light beam, where the polarization plane of the incident light beam is inclined at an angle close to 90°. When the polarization plane of the reflected light beam is rotated by ±θk, the output of the light-sensitive element receiving the TE mode is changed to respective amounts S+ and S−. Thus, the information reading is effected based on these output amounts S+ and S−.

While the first waveguide used in the illustrated embodiments has a same propagation constant with respect to both the TE mode and the TM mode, in order to maintain the predetermined polarization plane of the linearly polarized light beam being guided, a linearly polarized light beam generally tends to be an elliptically polarized beam if the propagation constants with respect to the TE and TM modes are different. The elliptically polarized light beam can be considered to be almost a linearly polarized light beam, if the long axis component of the elliptically polarized beam is sufficiently larger than the short axis component. In this sense, the information reading operation may be accomplished even if the propagation constants with respect to the TE and TM modes are slightly different. Namely, the propagation constants with respect to the TE and TM modes need not be exactly the same, or should be substantially the same.

Figure 8A:
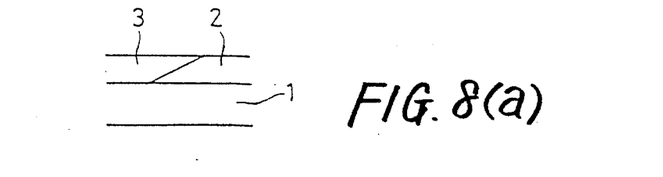
FIGS. 8(a) and 8(b) are illustrations showing modified embodiments of the invention.
Figure 8B:
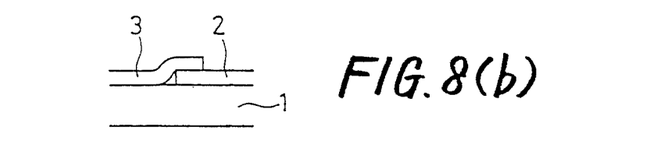
Figure 8C:
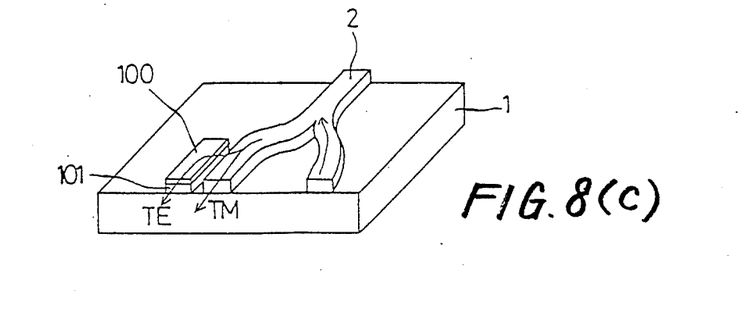
FIG. 8(c) is a perspective view of a yet further embodiment of the invention.

In the embodiments of FIGS. 1 and 3, the first and second waveguides 2, 3 are coupled to each other at the interface 6 which is perpendicular to the plane of the major surfaces of the substrate 1. However, the interface or boundary between the two waveguides 2, 3 may be inclined, as indicated in FIG. 8(a). Further, the coupling end portions of the first and second waveguides 2, 3 may be superposed on each other, as indicated in FIG. 8(b). A further modified arrangement of the waveguides is illustrated in FIG. 8(c), which employs a directional coupler wherein a second waveguide 101 is covered by a metal clad 100. The second waveguide 101 has different propagation constants with respect to the TE and TM modes. The propagation constant to one (TE mode in the embodiment of FIG. 8(c)) of the two modes is selected to be equal to that of the first waveguide 2. In this case, only the above-indicated one mode is guided into the second waveguide 101, as indicated in FIG. 8(c). The other mode (TM mode) is continuously guided through the first waveguide 2.

What is claimed is:

1. A thin-film optical function element, comprising:
a substrate formed of a dielectric material;
a first optical waveguide consisting of a thin film of a dielectric material formed on said substrate, said first optical waveguide having a substantially same propagation constant with respect to two different modes which have field patterns whose vibrating directions are perpendicular to each other; and a second optical waveguide consisting of another thin film of another dielectric material formed on said substrate, said second optical waveguide being optically coupled to said first optical waveguide, and guiding therethrough only one of said two different modes.

2. A thin-film optical function element according to claim 1, wherein said substrate consists of an anisotropic crystal, and said first optical waveguide permitting a TE mode and a TM mode to be propagated therethrough at a same velocity such that a linearly polarized light beam maintains a predetermined constant plane of polarization, said second optical waveguide having a refractive index which is intermediate between a first refractive index of said substrate with respect to ordinary rays of light, and a second refractive index of said substrate with respect to extraordinary rays of light.

3. A thin-film optical function element according to claim 1 wherein said two different modes are those of a linearly polarized light.

4. A thin-film optical function element, comprising:
a substrate formed of a dielectric material;
a first optical waveguide consisting of a thin film of an anisotropic crystal formed on said substrate, said first optical waveguide having a substantially same propagation constant with respect to two different modes which have field patterns whose vibrating directions are perpendicular to each other; and
a second optical waveguide consisting of a clad layer which partially covers said thin film of said first optical waveguide, said clad layer being optically coupled to said first optical waveguide, and having a refractive index which is intermediate between a first refractive index of said first optical waveguide with respect to ordinary rays of light and a second refractive index of said first optical waveguide with respect to extraordinary rays of light, whereby only one of said two different modes is guided through said clad layer as said second optical waveguide.

5. A thin-film optical function element, comprising:
a substrate formed of a dielectric material;
a first optical waveguide consisting of a thin film of a dielectric material formed on said substrate, said first optical waveguide having substantially the same propagation constant with respect to two different modes which have field patterns, the vibrating directions of which are perpendicular to each other; and
a second optical waveguide consisting of a thin film of a second dielectric material formed on said substrate, said first and second optical waveguides being optically coupled to each other by mutual contact thereof, said second optical waveguide permitting only one of said two different modes to propogate therethrough.

6. A thin-film optical function element, comprising:
a substrate formed of a dielectric material;
a first optical waveguide consisting of a thin film of a dielectric material formed on said substrate, said first optical waveguide having substantially the same propagation constant with respect to two different modes which have field patterns, the vibrating directions of which are perpendicular to each other; and
a second optical waveguide consisting of another thin film of another dielectric material formed on said substrate, said second optical waveguide having two different propagation constants with respect to said two different modes, respectively, and one of said two different propagation constants being equal to the propagation constant of said first optical waveguide, so that said first and second optical waveguides constitute a directional coupler in which only one of said two different modes which corresponds to said one of the two different propagation constants is guided into said second waveguide.

* * * * *